United States Patent
Kontola et al.

(10) Patent No.: US 7,242,731 B2
(45) Date of Patent: Jul. 10, 2007

(54) METHOD FOR SYNCHRONIZING A RECEIVER, A SYSTEM, AND AN ELECTRONIC DEVICE

(75) Inventors: Ilkka Kontola, Julkujärvi (FI); Samuli Pietila, Tampere (FI); Harri Valio, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 788 days.

(21) Appl. No.: 10/439,591

(22) Filed: May 16, 2003

(65) Prior Publication Data

US 2003/0215005 A1    Nov. 20, 2003

(30) Foreign Application Priority Data

May 16, 2002    (FI)    ................................. 20020927

(51) Int. Cl.
*H04L 7/00* (2006.01)
*H04B 1/707* (2006.01)

(52) U.S. Cl. ................. 375/354; 375/149; 375/150

(58) Field of Classification Search ................ 375/149, 375/354, 150
See application file for complete search history.

(56) References Cited

U.S. PATENT DOCUMENTS

| | | | |
|---|---|---|---|
| 6,222,874 B1 | 4/2001 | Walley et al. | |
| 6,366,599 B1 | 4/2002 | Carlson et al. | 375/130 |
| 6,597,678 B1 * | 7/2003 | Kuwahara et al. | 370/342 |
| 6,996,158 B2 * | 2/2006 | Bradley | 375/148 |
| 2001/0004380 A1 * | 6/2001 | Mannermaa | 375/150 |

FOREIGN PATENT DOCUMENTS

| | | |
|---|---|---|
| DE | 199 06 801 A1 | 2/1998 |
| EP | 1 107 018 A2 | 6/2001 |
| EP | 1107018 | 6/2001 |
| WO | WO 98/59444 | 12/1998 |
| WO | 0223213 | 3/2002 |
| WO | WO 02/23783 | 3/2002 |

* cited by examiner

*Primary Examiner*—Kevin Kim
(74) *Attorney, Agent, or Firm*—Alfreda A. Fressola; Ware, Fressola, Van Der Sluys & Adolphson LLP

(57) ABSTRACT

A method for synchronizing a receiver (1) with a transmitted code-modulated spread spectrum signal, uses at least one reference code (r(x)), which corresponds to a code used in the modulation, and determines the frequency shift of the transmitted signal and the code phase of the code used in the modulation. In the method, a correlation step is taken to form a correlation function matrix on the basis of the received signal and said reference code. A non-coherent search matrix is formed of said correlation function matrix. In the method, elements in said non-coherent search matrix are modified on the basis of at least one statistical property of the elements in said non-coherent search matrix, and/or high-pass filtering is performed before the formation of said correlation function matrix. The invention also relates to a system and a receiver in which the method is applied.

16 Claims, 6 Drawing Sheets

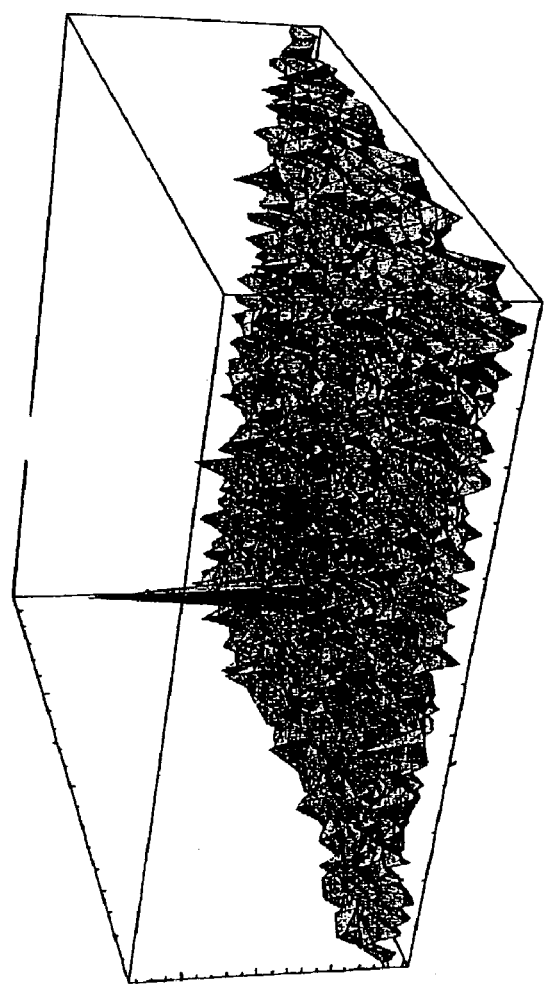
=
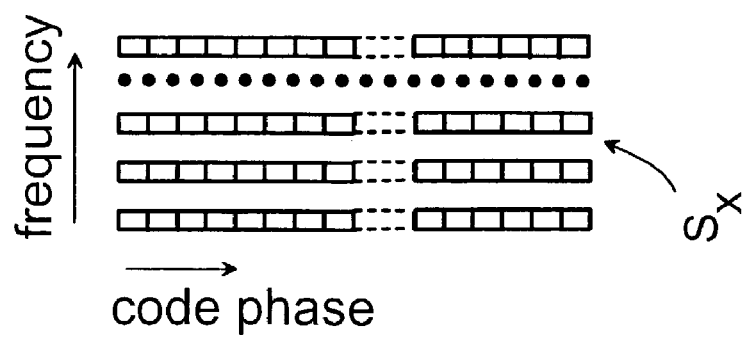
Fig. 5

METHOD FOR SYNCHRONIZING A RECEIVER, A SYSTEM, AND AN ELECTRONIC DEVICE

CROSS-REFERENCE TO RELATED APPLICATIONS

This application claims priority under 35 USC §119 to Finnish Patent Application No. 20020927 filed on May 16, 2002.

FIELD OF THE INVENTION

The present invention relates to a method for synchronizing a receiver with a transmitted code-modulated spread spectrum signal, in which method at least one reference code is used, which corresponds to a code used in the modulation, and the frequency shift of the transmitted signal and the code phase of the code used in the modulation are determined. The invention also relates to a system comprising a receiver with acquisition means for acquisition of a transmitted code-modulated spread spectrum signal, means for generating at least one reference code corresponding to the code used in the modulation, and means for determining the frequency shift of the transmitted signal and the code phase of the code used in the modulation. The invention further relates to an electronic device comprising a receiver with acquisition means for acquisition of a transmitted code-modulated spread spectrum signal, means for generating at least one reference code corresponding to the code used in the modulation, and means for determining the frequency shift of the transmitted signal and the code phase of the code used in the modulation.

Particularly in the reception of satellite signals, a significant problem is that the signal strength is low in the receiver. Thus, noise and other interference may significantly disturb the signal reception and, in some situations, it may be even impossible to receive signals. In addition to noise, interference may be caused by other signals whose carrier frequency is the same or almost the same as the frequency of the signal to be received. Furthermore, a DC voltage component in the signal may cause interference in direct conversion receivers and receivers applying a low intermediate frequency. A spurious signal at the receiving frequency and the DC shift may be shifted and/or aliased at different steps of the processing to spurious signals at different frequencies. It is difficult to eliminate these different sources of interference mentioned above, and moreover, the elimination of different forms of interference is not usually successful by applying a single interference suppression method.

BACKGROUND OF THE INVENTION

There are known systems based on the code division multiple access (CDMA). In such systems, the information to be transmitted is modulated with an individual code for each transmitter, a so-called pseudo random sequence. Thus, the same frequency can be used as the carrier frequency in different transmitters. As a result of the modulation, a code-modulated wideband signal is generated. This signal is received in the receiver, and an attempt is made to synchronize the receiver with it. The receiver knows the code used in the transmitter and uses it in the acquisition of the signal. This code can thus be used to distinguish between signals from different transmitters, even though the carrier frequencies were substantially the same. In the acquisition, a correlation technique is normally used to correlate the received signal with a code corresponding to the code used by the transmitter and generated in the receiver. The correlation result is examined to find the timing and/or frequency of the incoming signal corresponding to maximum correlation, i.e. the best alignment. However, interference may distort the correlation result or cause false maximum points, wherein the acquisition is not necessarily successful. For this, solutions have been developed to find the correct timing and frequency e.g. by prolonging the correlation time. However, particularly with weak signals, such as when signals transmitted by satellites are received indoors, acquisition by a conventional receiver would require several hours or even days, which, in practical situations, would make it even impossible to use such receivers indoors.

One known system applying the CDMA technology is the Global Positioning System (GPS) comprising several satellites orbiting the earth. Each operating satellite of the GPS system transmits a so-called L1 signal at the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, these signals are modulated with at least one pseudo sequence. This pseudo random sequence is different for each satellite. In each satellite, for modulating the L1 signal, the pseudo random sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with the polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible to generate different C/A codes by using identical code generators. The C/A codes are thus binary codes whose chipping rate in the GPS system is 1.023 Mchips/s. The C/A code comprises 1023 chips, wherein the repetition interval (epoch) of the code is 1 ms. The carrier of the L1 signal is further modulated by navigation information at a bit rate of 50 bit/s. The navigation information comprises information about the "health", orbit, time data of the satellite, etc. In the GPS system, the codes used in the modulation of the L1 signal are not particularly efficient in view of eliminating the above-presented narrow-band interference. Thus, the cross-correlation caused by a strong spurious signal in the weaker signal to be received may prevent the receiver from acquiring this signal to be received.

The receiver must perform the acquisition e.g. when the receiver is turned on and also in a situation in which the receiver has not been capable of receiving the signal of any satellite for a long time. Such a situation may easily occur e.g. in portable devices, because the device is moving and the antenna of the device is not always in an optimal position in relation to the satellites, which impairs the strength of the signal coming in the receiver. Also, in urban areas, buildings affect the signal to be received, and furthermore, so-called multipath propagation may occur, wherein the transmitted signal comes into the receiver along different paths, e.g. directly from the satellite (line-of-sight) and also reflected from buildings. Due to this multipath propagation, the same signal is received as several signals with different phases.

The above-mentioned acquisition and frequency control process must be iterated for each signal of a satellite received in the receiver. Consequently, this process takes a lot of time, particularly in a situation, in which the signals to be received are weak. To speed up this process, some prior art receivers use several correlators, wherein it is possible to search for several correlation peaks simultaneously. In practical solutions, the process of acquisition and frequency control cannot be accelerated very much solely by increasing the number of correlators, because the number of correlators cannot be increased infinitely.

In some prior art GPS receivers, FFT technique has been used in connection with conventional correlators to determine the Doppler shift of the received GPS signal. These receivers use the correlation to restrict the bandwidth of the received signal to 1 kHz. This narrow-band signal is analyzed with FFT algorithms to determine the carrier frequency.

SUMMARY OF THE INVENTION

It is an aim of the present invention to provide a method for accelerating the acquisition, and a receiver in which the acquisition of the transmitted signal can be performed significantly faster than in receivers of prior art, also with weak signals and interference. The invention is particularly suitable for use in positioning receivers but also in other receivers, preferably CDMA receivers, in which the receiver must be synchronized with a spread spectrum signal. The invention is based on the idea that a non-coherent search matrix formed of a correlation function matrix is post-processed by statistical methods. Furthermore, it is possible to carry out high-pass filtering of the computed values of the correlation functions for the output signal. To put it more precisely, the method according to the present invention is primarily characterized in carrying out a correlation step to form a correlation function matrix on the basis of the received signal and said reference code, forming a non-coherent search matrix from said correlation function matrix, and that the method comprises at least one of the following steps:

modifying the elements of said non-coherent search matrix on the basis of at least one statistical property of the elements of said non-coherent search matrix, performing high-pass filtering before forming said correlation function matrix.

The system according to the present invention is primarily characterized in that the system also comprises correlation means for forming a correlation function matrix on the basis of the received signal and said reference code, means for forming a non-coherent search matrix from said correlation function matrix, and at least one of the following means:

means for modifying the elements of said non-coherent search matrix on the basis of at least one statistical property of the elements of said non-coherent search matrix, means for performing high-pass filtering before the formation of said correlation function matrix.

Further, the electronic device according to the present invention is primarily characterized in that the electronic device also comprises correlation means for forming a correlation function matrix on the basis of the received signal and said reference code, means for forming a non-coherent search matrix from said correlation function matrix, and at least one of the following means:

means for modifying the elements of said non-coherent search matrix on the basis of at least one statistical property of the elements of said non-coherent search matrix, means for performing high-pass filtering before the formation of said correlation function matrix.

Considerable advantages are achieved by the present invention when compared with methods, systems and electronic devices of prior art. By the method according to the invention, it is possible to significantly suppress the interference to DC voltage shift (offset) or due to other strong in-band signals. It is thus possible to receive also weaker signals than by receivers of prior art.

DESCRIPTION OF THE DRAWINGS

In the following, the present invention will be described in more detail with reference to the appended drawings, in which FIG. 5 shows the conclusion step of the method according to a preferred embodiment of the invention in a reduced manner.

DETAILED DESCRIPTION OF THE INVENTION

In the following description, the method according to an advantageous embodiment of the invention will be exemplified with a receiver shown in FIG. 1 and intended for use as a receiver of signals transmitted by GPS satellites, for positioning. However, it will be obvious that the invention is not limited solely to such receivers, but the receiver used can also be another receiver intended for receiving a code modulated signal. Also, the receiver may differ from the receiver of FIG. 1 in detail.

Figure 1:
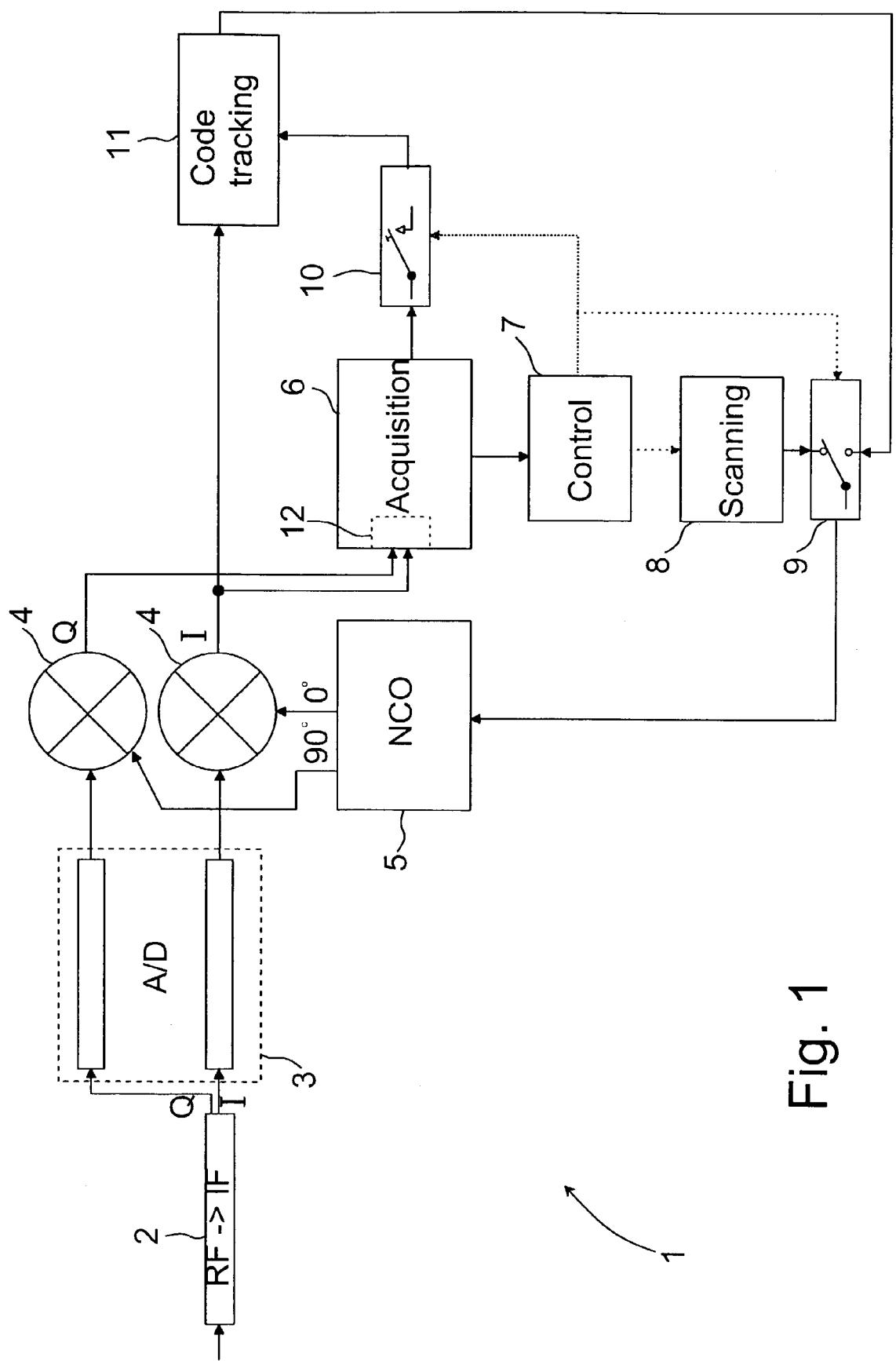
FIG. 1 shows, in a simplified block chart, a receiver in which the method according to the invention can be applied.

In the receiver 1 of FIG. 1, the signal to be received is preferably converted into an intermediate frequency in a converter block 2. At this stage, the signal comprises two components, known as such: the I and Q components, with a phase difference of 90° therebetween. These analog signal components converted to an intermediate frequency are digitized in a digitization block 3 and led to a multiplier block 4. In the multiplier block 4, the I and Q components of the digitized signal are multiplied by a signal generated by a numerically controlled oscillator (NCO) 5. This signal of the numerically controlled oscillator 5 is intended to correct the frequency offset caused by the Doppler shift and the frequency error of the local oscillator (not shown) of the receiver 1. The signal generated by the multiplier block 4 is led to an acquisition block 6. This acquisition block 6 finds the spreading code phase and frequency offset of the satellite, to be used in operations after the acquisition. During the acquisition, a control block 7 is used to control a scanning block 8, by means of which the frequency of the numerically controlled oscillator 5 is adjusted, if necessary. The control block 7 controls a first switch 9 to switch either the signal generated by this scanning block 8 to the numerically controlled oscillator 5 during the acquisition, or the control signal generated by a code determination block 11 to the numerically controlled oscillator 5 after the acquisition. A second switch 10 is used to control this operation of the tracking block 11. This tracking block 11 forms a part of the code phase locked loop, known as such, and the carrier phase locked loop (not shown).

After turning on the operating voltages, or in a situation in which the receiver 1 has not been capable of receiving the signal of GPS satellites for a long time, the receiver 1 performs a two-dimensional searching step for each satellite whose signal is to be received. In this two-dimensional searching step, the aim is to determine the carrier frequency and code phase for each satellite. The carrier frequency is thus affected by the Doppler shift caused by the movement of the satellite, as well as by inaccuracies in the local oscillator of the receiver. The frequency uncertainty may be relatively large, for example ±6 kHz, wherein the receiver 1 must scan a frequency range of about 12 kHz in relation to the actual transmission frequency (L1=1575.42 MHz). Moreover, the receiver 1 does not know the precise code phase, wherein the receiver must also determine the code phase from 1023 possible code phases. This will result in a two-dimensional search process, in which one dimension is the frequency offset in the range of 12 kHz and the second dimension is the code phase from 1023 different code phases. In the method according to a preferred embodiment of the invention, it is possible to scan a frequency range of about 500 Hz at a time, wherein the method is iterated, if necessary, 24 times to cover the whole frequency range of 12 kHz to be scanned. It is obvious that the example values in this description are only used to clarify the invention, but not as restricting examples. The invention can also be applied in systems other than GPS systems, wherein e.g. said frequency values, code phases and the number of codes may vary. The search process does not necessarily need to be two-dimensional, but in some embodiments, it may also have one dimension or more than two dimensions. Thus, in a single-phase search process, the aim is to find out, for example, the code phase.

We shall now describe the acquisition operation based on forming a two-dimensional search matrix in the receiver 1 of FIG. 1. To start the acquisition, the scanning block 8 sets the frequency of the numerically controlled oscillator 5 so that the receiver 1 preferably receives the lowest frequencies in the frequency range, in this example from 1575.414 MHz to 1575.4145 MHz. The receiver may also determine the starting frequency so that the receiver utilizes e.g. previously determined position data and/or almanac data, wherein the acquisition can be further accelerated. Samples of the received signal are preferably stored in a sample vector forming block 12 as complex sample vectors $p_k(1)$, $p_k(2) \ldots p_k(N)$, which each comprise 1023 samples in this preferred embodiment. In this advantageous embodiment, the frequency of storing samples in the sample vector forming block 12 is substantially the same as or higher than the chipping rate, that is, 1.023 to 10.23 Msamples/s. The sample vectors are immediately adjacent so that the next sample vector immediately follows in time the previous sample vector, i.e. the time difference between the last sample of a sample vector and the first sample of the next sample vector is substantially the same as the time difference between successive samples in the sample vector. Thus, these 1023 samples represent a signal with the length of about 1 ms, wherein in the time-to-frequency conversion, the frequency range is about 1 kHz, of which a part can be utilized. The sample vector forming step is indicated by reference 101 in the appended FIG. 2.

Figure 2:
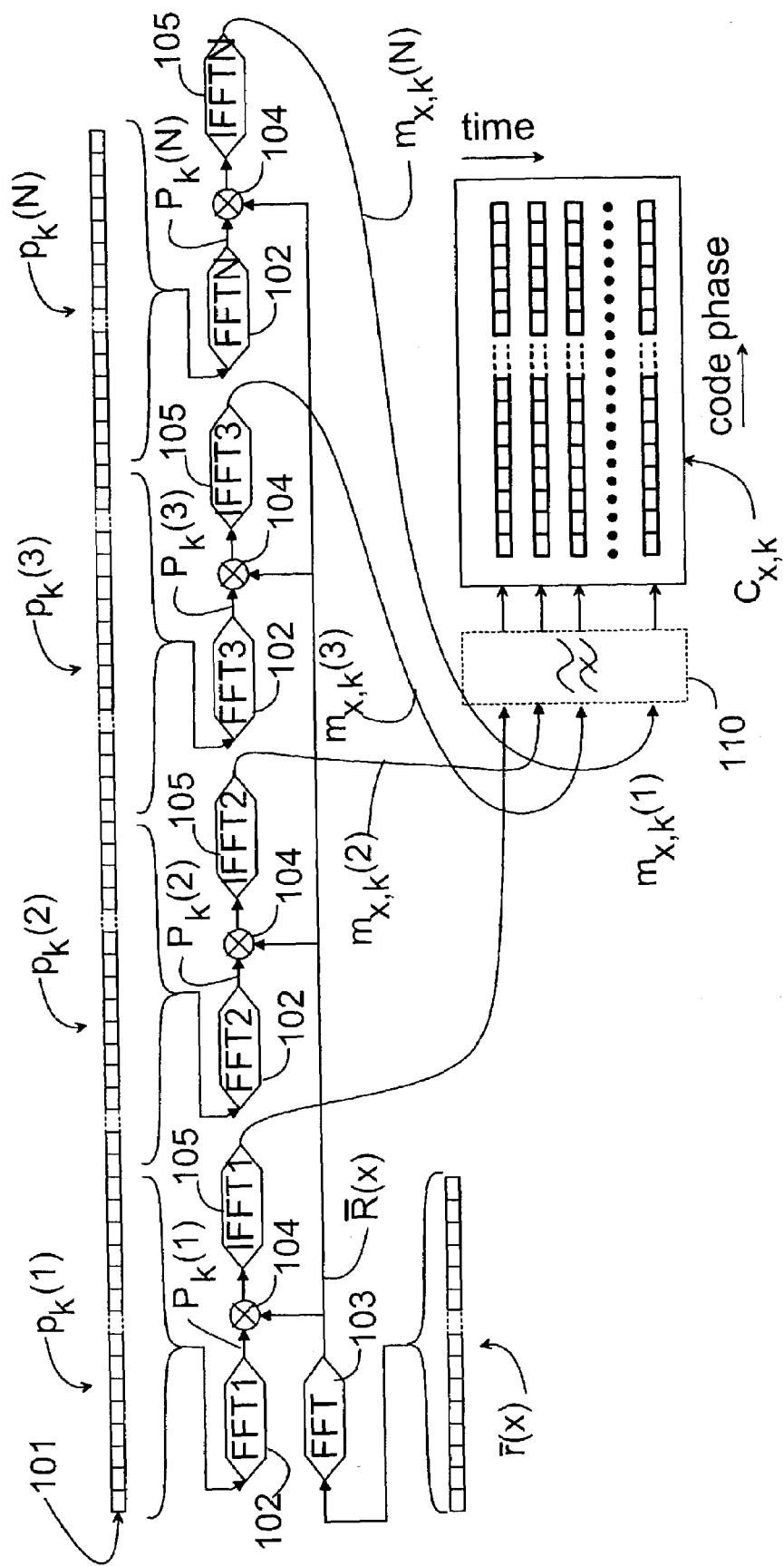
FIG. 2 shows the correlation step of the method according to a preferred embodiment of the invention in a reduced chart.

The number of sample vectors is advantageously N, in which N is preferably a power of two. Furthermore, in an advantageous embodiment of the invention, the forming of sample vectors is iterated K times, as will be presented below in this description. Subindex k will be used hereinbelow to indicate different iterations. When determining the value of the number N of the sample vectors $p_k(1)$, $p_k(2) \ldots p_k(N)$ in the GPS system, one must take into account that the signal contains information modulated at a bit rate of 50 bits/s by binary phase modulation. Another factor limiting this number N of the sample vectors $p_k(1)$, $p_k(2) \ldots p_k(N)$ is the frequency stability of the local oscillator in the receiver. In addition to the step of forming the sample vectors, in the acquisition method according to the invention, a correlation step is taken in order to form a correlation function matrix. This correlation step can be taken partly already during the sampling, or after the formation of N number of sample vectors $p_k(1)$, $p_k(2) \ldots p_k(N)$. If the correlation step is taken e.g. so that, after the storage of each sample vector, a time-to-frequency conversion is computed for it, such as a Fast Fourier transform (FFT), the same time-to-frequency converter can be used for all N sample vectors $p_k(1)$, $p_k(2) \ldots p_k(N)$. However, if the correlation step is taken after the storage of the N sample vectors, either a separate time-to-frequency converter must be used for each sample vector, or the time-to-frequency conversions are performed for the different sample vectors one after the other in the same time-to-frequency converter. FIG. 2 shows the correlation step of the method, wherein a correlation function matrix $C_{x,k}$ is formed of the sample vectors $p_k(1)$, $p_k(2) \ldots p_k(N)$. Below in this description, the Fourier transform and the inverse Fourier transform will be primarily used as examples of the time-to-frequency conversion and the inverse conversion, i.e. frequency-to-time conversion, respectively; however, it will be obvious that the present invention is not limited solely to these examples.

Each sample vector $p_k(1)$, $p_k(2) \ldots p_k(N)$ is subjected to discrete Fourier transform 102, preferably fast Fourier transform (FFT):

$$P_k(i) = FFT(p_k(i)), \text{ in which } i=1, \ldots, N \quad (1)$$

This is illustrated by blocks FFT1, FFT2, ..., FFTN in FIG. 2. In arithmetic operations in practice, preferably 1024 values are used, because the discrete Fourier transform can thus be implemented in a considerably more efficient way in practical applications (with the FFT algorithm) than when using 1023 values. One way of achieving this is to add an extra zero to make the number of elements 1024. This will have an insignificant effect on the transform result.

The codes of all those transmissions, for whose reception the receiver 1 is intended, are preferably stored in the receiver. Thus, in connection with the GPS system, the receiver 1 contains the stored reference codes r(x) corresponding to the C/A codes for the satellites (not shown) in the GPS system, wherein x refers to the satellite index, x ranging for example from 1 to 36. The reference codes do not necessarily need to be stored but they can also be generated in the receiver. At the correlation stage, the reference code of the satellite which transmitted the signal to be acquired by the receiver is selected or generated. The reference code is reversed in time. This reversed reference code, which is indicated with reference r̄(x) in FIG. 2, is subjected to a discrete Fourier transform 103, preferably a Fast Fourier transform, or FFT:

$$\bar{R}(x) = FFT(\bar{r}(x)) \quad (2)$$

The time-reversed reference code r̄(x) and/or its fast Fourier transform may already have been stored in advance in the memory means of the receiver, or it is formed from the reference code r(x) in connection with the acquisition.

Next, in the correlation step, the Fourier transform result $P_k(i)$ of each sample vector $p_k(i)$ is multiplied 104 with the Fourier transform $\overline{r}(x)$ result of the inverse reference code $\overline{R}(x)$:

$$M_{x,k}(i) = \overline{R}(x) \cdot P_k(i) \tag{3}$$

These products of the multiplications are further subjected to an inverse Fourier transform 105, wherein the result is the cross correlation of the reference code $r(x)$ and the received signal with all possible integer delays (1023).

$$m_{x,k}(i) = iFFT(M_{x,k}(i)) \tag{4}$$

This is based on the fact that the Fourier transform of the convolution of the signals in the time domain corresponds to the multiplication of the Fourier transformed signals, i.e. signals of the time domain converted to the frequency domain. As also the time-reversed reference code is used, the Fourier transform can be used to perform a fast correlation in discrete time. Thus, in this preferred example, the cross correlation result comprises 1023 elements. These cross-correlation results $m_{x,k}(i)$ formed of different sample vectors $p_k(i)$ are compiled to a correlation function matrix $C_{x,k}$, in which the number of rows is the number N of the sample vectors.

It is obvious that, instead of time-reversal of the reference code in time, time-reversed sample vectors $\overline{p}_k(i)$ can be formed of the sample vectors $p_k(i)$, wherein the reference code $r(x)$ is used directly and time-reversed sample vectors are used in the above-presented arithmetic operations.

It should also be pointed out that in view of applying the present invention as a whole, the method used for producing the cross-correlation result is not significant as such.

The rows in the correlation function matrix $C_{x,k}$ formed in the correlation step represent the cross-correlation of the received signal and the reference code with various phase differences taken at intervals of one millisecond. The correlation function matrix can thus be presented as the following formula:

$$C_{x,k} = \begin{bmatrix} m_{x,k}(1) \\ m_{x,k}(2) \\ \vdots \\ m_{x,k}(N) \end{bmatrix} \tag{5}$$

Figure 3:
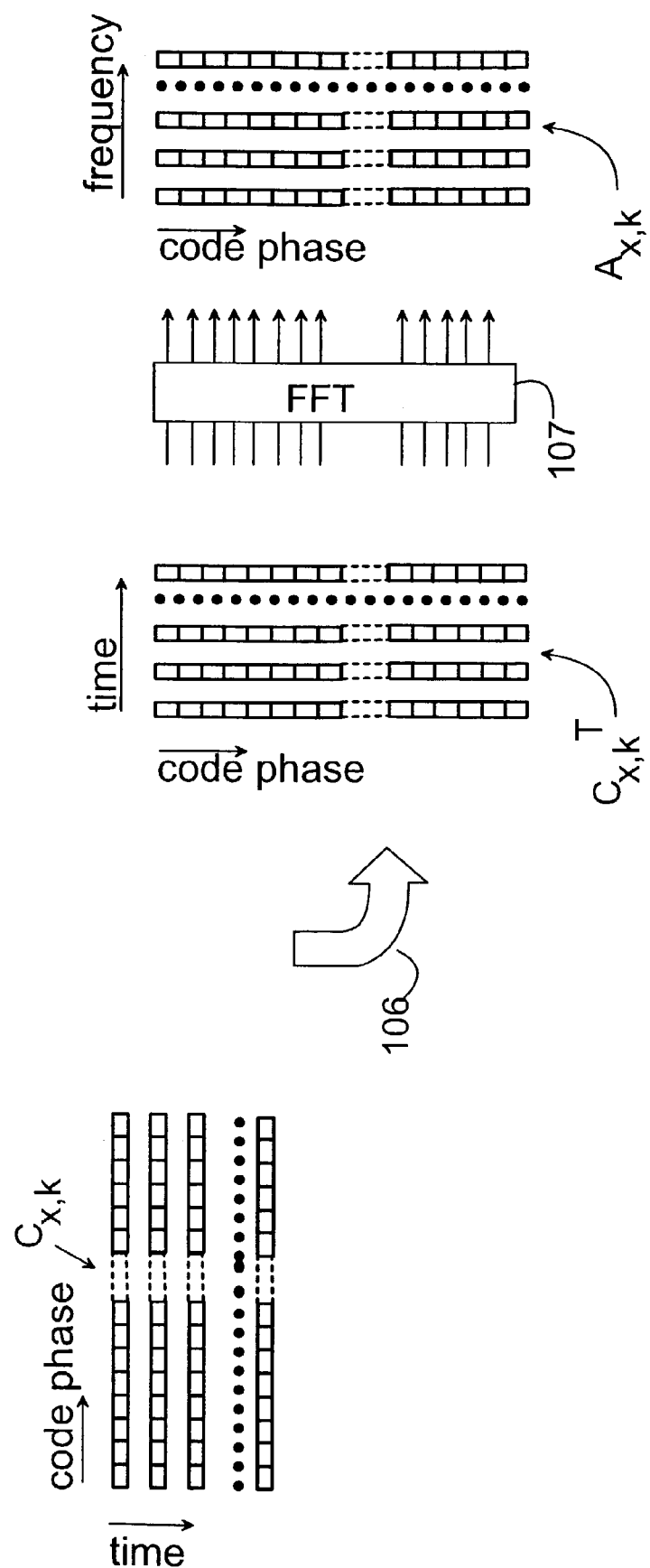
FIG. 3 shows the analysis step of the method according to a preferred embodiment of the invention in a reduced chart.

In the next step, i.e. the analysis step, a transposition 106 of the correlation function matrix $C_{x,k}$ will be used, the rows representing samples of the signal in the time domain. Each row corresponds to a specific code phase difference between the received signal and the reference code. Each row of the transpose of this correlation function matrix $C_{x,k}$ is subjected to a Fourier transform 107 to form a coherent search matrix $A_{x,k}$. This is illustrated in the appended FIG. 3.

$$A_{x,k} = FFT(C_{x,k}^T) \tag{6}$$

In practical applications, a separate transposed matrix does not need to be formed from the correlation function matrix, but the elements of the stored correlation function matrix $C_{x,k}$ are read from a memory 16 (FIG. 6) in a different direction, preferably in columns.

The correlation function matrix $C_{x,k}$ can also be formed e.g. by using matched filters, known as such. Thus, the output signal of the matched filter is preferably sampled by forming a sample signal suitable for the further processing steps, such as the Fourier transform 107. In this step, the sampling frequency is about 1 kHz, in the case of a receiver intended to receive signals from GPS satellites.

Figure 4:
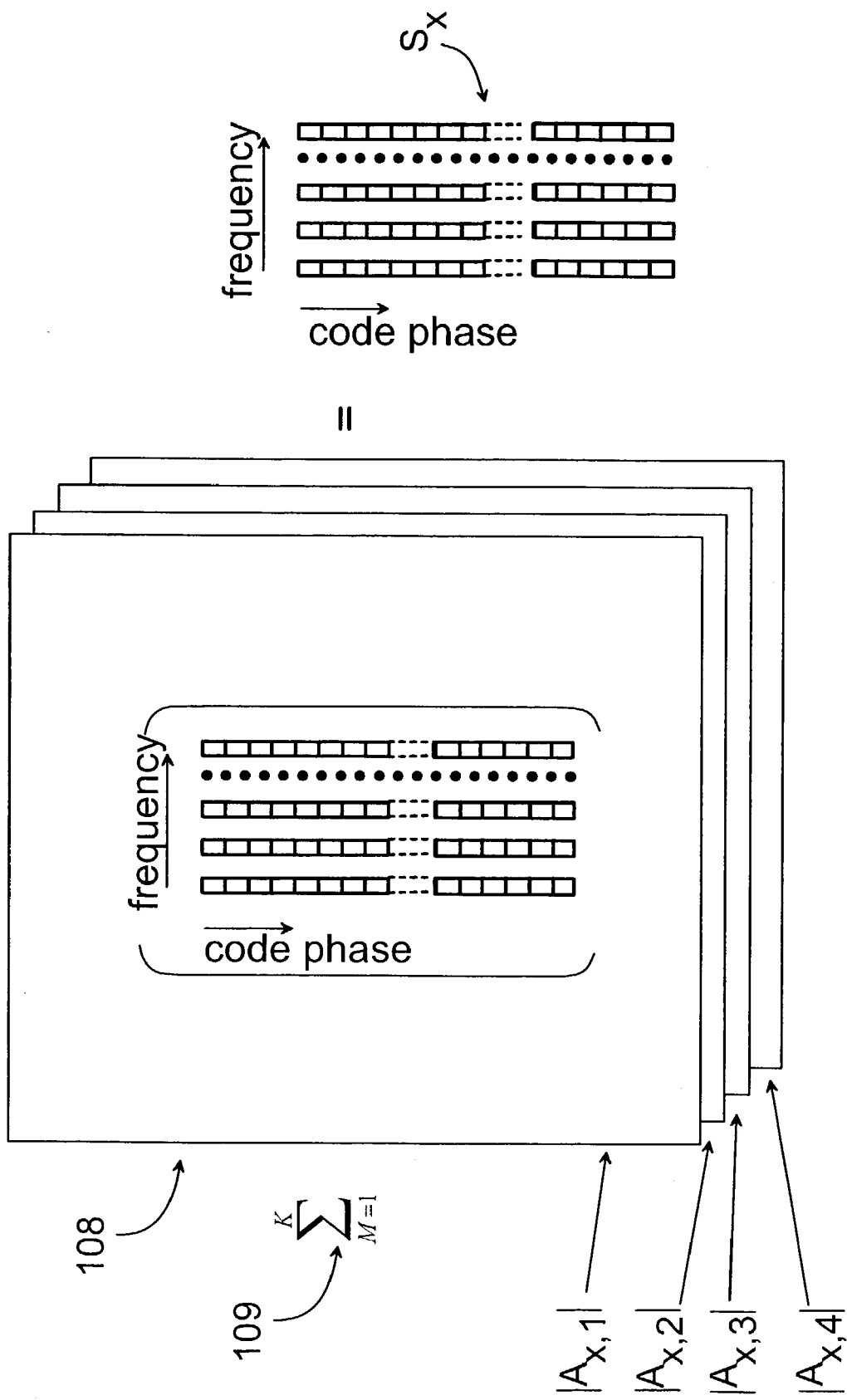
FIG. 4 shows the summing step of the method according to a preferred embodiment of the invention in a reduced manner.

Furthermore, the acquisition block 6 comprises a non-coherent summing step to improve the signal-to-noise ratio. To implement the non-coherent summing step, the above-presented steps of sample vector formation, correlation and analysis are iterated 108 K times (FIG. 4). This number K of iterations is preferably selected so that the signal-to-noise ratio can be improved to a sufficient degree but within a reasonable time. At each time of performing the analysis, one coherent search matrix $A_{x,k}$ is formed, for which the non-coherent summing is performed to form a non-coherent search matrix $S_x$. The non-coherent search matrix $S_x$ is preferably formed in the following way. From the complex elements $a_{x,k}(i,j)$ of each coherent search matrix $A_{x,k}$, preferably the magnitude (absolute value) or another numerical value is calculated, such as the second power of the magnitude of the element. The numerical values calculated from the corresponding elements of the non-coherent search matrix are summed up 109, i.e. the matrices are summed up, which can be presented by the formula:

$$S_x = \sum_{k=1}^{K} \begin{bmatrix} |a_{x,k}(1,1)| & \cdots & |a_{x,k}(1,N)| \\ \vdots & \ddots & \vdots \\ |a_{x,k}(1023,1)| & \cdots & |a_{x,k}(1023,N)| \end{bmatrix} \tag{7}$$

In practical solutions, the non-coherent search matrix can be formed in at least two ways. In the first implementation alternative, the coherent search matrix formed at each iteration time is stored. After the necessary iterations, the non-coherent search matrix is formed by summing up the corresponding elements according to Formula 8. In this implementation alternative, a memory is needed for storing all the elements of the coherent search matrices. According to the second implementation alternative, one coherent search matrix is calculated first, and its values are copied as elements of the sum matrix. Each following iteration time, a coherent search matrix is formed, whose values are added to the corresponding elements in the non-coherent search matrix. In this alternative, the summation of the corresponding elements is thus performed each iteration time. Thus, only one coherent search matrix is stored, wherein less memory space is required than in the first alternative.

After the necessary iterations have been completed, the values of the elements $s_x(i,j)$ of this non-coherent search matrix $S_x$ are modified in a modification step in order to improve the rate and accuracy of the acquisition. In connection with an advantageous embodiment of the invention, this is implemented in the following way: The non-coherent search matrix is preferably used to form two filtration matrices to be used as the basis for the acquisition. To compute the filtration matrices, preferably the first and the second scaling factor are computed from the elements of the different code phases corresponding to each frequency, by using suitable statistical methods. This computation is thus performed according to columns in the case that each row in the search matrix corresponds to a given code phase difference between the received signal and the reference code. The first scaling factor is computed, for example, as the average of all the different code phases corresponding to one frequency. Next, this first scaling factor is subtracted from all the values in this column, and these results are compiled to one column in the first filtration matrix. The second scaling factor can be preferably computed by means of the standard deviation. Thus, the standard deviation is calculated from the values in each column and can be scaled by multiplying it with a suitable number, for example seven. Next, this second scaling factor is subtracted from the column values and the resulting values are stored as column values of the second filtration matrix. If any value is negative after said subtractions, it is preferably set to zero.

The above-presented steps are iterated for each column of the non-coherent search matrix; that is, separate first and second scaling factors are computed for each column to be used for modifying the values of the column in question, and are stored as the column values for the first and second filtration matrices. After forming the first and second filtration matrices, the aim is to find from the first and/or second filtration matrices a value which exceeds a predetermined threshold value and is clearly greater than the other values. If such a value is found, it indicates the code phase difference as well as the frequency offset, because it is probably a signal transmitted by a satellite. If the signal is not the desired signal but noise or another spurious signal, no significant correlation peaks should occur. The code phase difference and the frequency difference are manifested by the row index and the column index of this highest value, respectively. The above-presented modification based on the average will efficiently eliminate DC shift interference. This is based on the fact that the DC shift will have a substantially equal effect on all the values in a column. Thus, the average of the values in such a column is relatively high. In a corresponding manner, the modification based on the standard deviation will effectively affect cross-correlation interference, such as cross-correlation results caused by a strong spread spectrum transmission at substantially the same frequency. This is based on the fact that cross-correlation caused by a spurious signal will only affect some of the different code phases, wherein the standard deviation and also the variance will be relatively high. The above-mentioned computations can be preferably made in a digital signal processor 15 or in another computing means suitable for the purpose.

The example of FIG. 5 shows a situation in which interference is suppressed and a value clearly higher than the other values has been found. However, if no such value is found in the non-coherent search matrix $S_x$, i.e. a signal transmitted by the searched satellite was probably not received in the frequency range under examination, the frequency band under examination is changed and the above-presented steps are taken to form a non-coherent search matrix. By this method, the whole range of 12 kHz under examination can be scanned by iterating the above-presented steps a sufficient number of times.

It necessary, the above-presented steps can be iterated for the whole frequency band under examination, storing the filtration matrices formed at the different iteration times, or only the possible peaks, before searching for the highest correlation peak. In this way, the possibility of misinterpretations can be reduced e.g. in such a situation in which the threshold value is set too low and a spurious signal not yet filtered enough may cause a misinterpretation.

Naturally, the invention can also be applied by forming one filtration matrix first, for example the first filtration matrix. If one value clearly higher than the other values is not found from this filtration matrix, the second filtration matrix will also be formed and the search will be carried out on the basis of its values. It is also possible to form one filtration matrix first, for example the first filtration matrix, and if no value substantially higher than the other values is found from this filtration matrix, the second filtration matrix can be formed of this first filtration matrix, to carry out the search on the basis of its values.

In the method according to another advantageous embodiment of this invention, the high-pass filtering 110 (FIG. 2) is performed before the formation of the search matrices. This high-pass filtering is preferably performed after the computation of the correlation function, before the formation of the correlation function matrix $C_{x,k}$. Thus, the high-pass filtering is performed for the cross-correlation results $m_{x,k}(i)$ formed of the sample vectors $p_k(i)$, and the correlation function matrix $C_{x,k}$ is formed of the high-pass filtered values.

We shall now discuss the effect of high-pass filtering on the signal. The DC shift in the output of the analog-to-digital converter 3 is converted to a low-frequency sinusoidal signal in a mixer 4. The frequency of this sine wave to be formed is substantially the same as the frequency of the numerically controlled oscillator 5. Assuming that the frequency shift at the carrier frequency is limited to be less than 100 kHz, the frequency of the sine wave will always be lower than 100 kHz. The desired signal in the output of the means for computing the correlation function has substantially the length of one scatter code symbol (chip) which, in the GPS system, thus means 0.98 μs impulses (=1/1023000 s). This impulse contains considerably higher frequencies than the sine waves generated from the DC shift. Thus, the high-pass filtering will not suppress the desired signal to an adverse extent.

In this context, it should be mentioned that low-frequency interference will always act as said DC shift. Thus, the effect of any interference at a frequency lower than the barrier frequency of the high-pass filter can be eliminated by the high-pass filter. Said position of the high-pass filter after the computation of the correlation function is advantageous, because the word length of the samples there is normally at least ten bits, which will be sufficient to prevent the high-pass filter from impairing the quality of the actual signal. However, the resolution of the analog-to-digital converter 3 is, e.g. for reasons of power consumption and to limit the complication of the required equipment, normally only two to four bits, which is normally not an adequate word length to perform high-pass filtering of sufficient quality.

In addition to the high-pass filtering, if necessary, one filtration matrix may be advantageously formed of the search matrix, preferably using the standard deviation as the statistical function, as presented above. In this way, it is possible to suppress both DC shift interference and cross-correlation interference substantially more efficiently than in receivers of prior art.

After determining the correct frequency offset and code phase, the receiver can be set in a tracking mode. With the weakest signals, data reception will not be successful, but, in a way known as such, one must turn to data obtained e.g. via a mobile communication network. Distance measuring is still possible with the reduced accuracy. The tracking mode is set by changing the switches (FIG. 1) to another position, wherein the received information is led to the tracking block 11, in which also a feedback is formed for the fine adjustment of the frequency of the numerically controlled oscillator 5.

To calculate the position, the receiver performs the reception of a signal preferably on the basis of the signal received from at least four satellites. Thus, the above-presented acquisition is iterated, if necessary, for the signal of each satellite, wherein the reference sequence r(x) is selected to be the code of the satellite to which the acquisition is made at the time.

Furthermore, we shall discuss the effect of aliasing in the receiver 1 according to the invention. The aliasing phenomenon occurs, if signals whose frequency is higher than one half of the sampling rate are led to the analog-to-digital conversion. As mentioned above, the DC shift in the output of the analog-to-digital converter 3 is converted to a low-frequency sinusoidal signal by the frequency conversion in the mixer 4. The frequency of this sinusoidal signal is substantially the same as the negation of the frequency of the numerically controlled oscillator 5. For example, if the frequency shift is +20 kHz and the search is being carried out at a frequency range with a medium frequency of −1300 Hz, the frequency of the numerically controlled oscillator 5 is set to the value +20000+−1300 Hz=+18700 Hz. The frequency conversion converts the frequency of the satellite signal to be received to about 0 Hz, wherein the frequency of the sine wave caused by the DC shift is shifted downwards to about −18700 Hz. After the frequency conversion and the decimation, the signal is subjected to the computation of the correlation function. The computation of the correlation function suppresses signals of different frequencies in different ways, wherein the effect of the DC shift interference depends on the magnitude of the frequency shift.

After the computation of the correlation function, the signal is sampled again at a sampling frequency of, for example, 1 kHz. At this stage, all the signals outside the frequency of +/−500 Hz will be aliased to the range from −500 Hz to +500 Hz. Also, the signal formed of the DC shift will be aliased to this range. The frequency of this aliased signal formed by the DC shift can be computed by subtracting or adding a suitable quantity of whole kilohertzes to the frequency of the sinusoidal signal. For example, the frequency −18700 of the sinusoidal signal will be 300 Hz after the aliasing, because −18700+19000=+300. This can be presented by the formula $f_{cal} = f_{orig} - 1000*[f_{orig}/1000]$, in which the denotation [ ] refers to rounding to the closest integer, $f_{orig} = -f_{NCO}$, and $f_{NCO}$ is the frequency of the numerically controlled oscillator 5 in the frequency conversion. Using this formula, it is possible to compute the frequency of the interference caused by the DC shift, wherein it is possible to avoid the column corresponding to this frequency in the non-coherent search matrix.

Also, the effect of cross-correlation can be analyzed in a corresponding manner by means of the aliasing phenomenon. The frequency conversion will also cause shifting and aliasing of the frequency of the cross-correlation interference. For example, if the value of the frequency shift is +20 kHz, the Doppler frequency of the satellite causing cross-correlation is +2400 Hz, and the medium frequency of the frequency range under examination is −1300 Hz, the frequency of the numerically controlled oscillator 5 is set to the value 18700 Hz. Thus, the frequency of the cross-correlation signal will be changed to +3700 Hz.

Due to the properties of the Gold codes, the computation of the correlation function will amplify not only the desired signal but also the cross-correlation signal. However, the amplification of cross-correlation signals is typically about 20 to 25 dB lower than the amplification of the desired signal. Thus, the cross-correlation will primarily cause problems when the signal strength of the interfering satellite is more than 20 dB higher than the strength of the desired signal.

The aliasing will also affect the cross-correlation. By resampling at the frequency of 1 kHz, the cross-correlation signals will be aliased to the range from −500 Hz to +500 Hz. The above-presented formula for calculating the aliasing frequency will also apply in this case. In the formula, the original signal $f_{orig}$ is now represented by the frequency of the cross-correlation signal after the frequency conversion.

A majority of the blocks required for implementing the method can be implemented, for example, in a digital signal processor (DSP). When making the Fast Fourier Transforms, it is possible to use either hardware-based solutions or software implementations of the digital signal processor. Furthermore, to control the operation of the receiver, it is possible to use a control means, preferably a microprocessor or the like. In the high-pass filtering, a hardware-based implementation is preferably used, because the computation time available is short. For example, in a GPS application, the sampling frequency in the output of the means for computing the correlation function is in the order of 1 MHz to 10 MHz.

Figure 6:
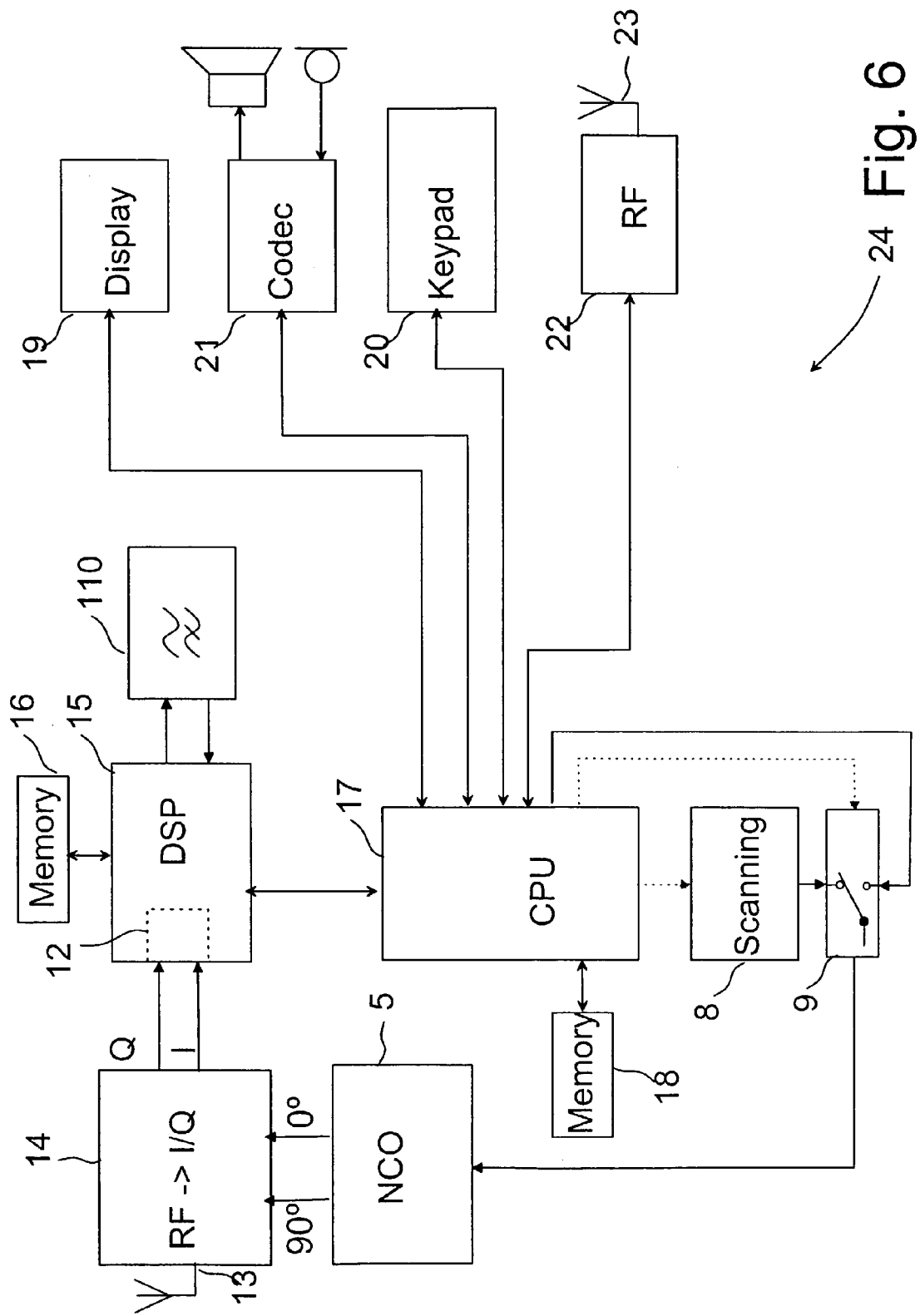
FIG. 6 shows an electronic device according to a preferred embodiment of the invention in a reduced block chart.

Further, the appended FIG. 6 shows an electronic device 24 according to an advantageous embodiment of the invention, comprising a wireless communication device and a positioning receiver. A first antenna 13 is used to receive a signal transmitted from positioning satellites. The received signal is transferred to a first radio part 14, in which the signal is converted to an intermediate frequency and digitized. A first radio part comprises, for example, a converter block 2, a digitizing block 3 and a multiplication block 4 for the receiver of FIG. 1. The digitized signal, which in this case preferably comprises I and Q components, is led to a digital signal processor 15 for e.g. forming sample vectors in a sample vector formation block 12. Samples are stored in first memory means 16 which comprise e.g. a random access memory and preferably also a read-only memory and/or a non-volatile random access memory for the storage of the program code of the digital signal processor 15. In this embodiment, e.g. operations of the acquisition block 6, such as the formation of the correlation function matrix $C_{x,k}$ e.g. with Fourier converters FFT1, FFT2, . . . , FFTN and/or matched filters, are implemented in the signal processor 15. Preferably, the coherent search matrix $A_{x,k}$ is formed and the non-coherent summing step and the modification step are also taken in the digital signal processor 15. The digital signal processor 15 transmits information about the computed phase difference and the frequency offset to the processor block 17 which comprises e.g. a microprocessor and I/O logic. The processor block 17 controls the scanning block 8 as well as the first switch 9. Preferably, the tracking block 11 is at least partly implemented as program commands of the processor block. Second memory means 18 are used as the data memory and the program memory for the processor block 17. It is obvious that the first memory means 16 and the second memory means 18 can also comprise a common memory. Positioning information can be displayed to the user on a display 19. In the electronic device of FIG. 6, the high-pass filtering is implemented on hardware basis in a high-pass filter 110.

Also, functions of a wireless communication device are implemented in the application software of the processor block 17. Thus, a display 19 can also be used, in a way known as such, e.g. to display call information. The user can use a keypad 20 to control the positioning receiver and the wireless communication device. A codec 21 is used to code and decode audio signals. Furthermore, FIG. 6 shows a radio part 23 and a second antenna 23 for the wireless communication device.

The present invention is not limited to the above-presented embodiments, but it can be modified within the scope of the appended claims.

The invention claimed is:

1. A method for synchronizing a receiver with a transmitted code-modulated spread spectrum signal comprising:
   forming correlation results on the basis of a received code-modulated spread spectrum signal and a reference code which corresponds to a code used in the modulation of said signal;
   forming a correlation function matrix of the correlation results; and
   forming a non-coherent search matrix of said correlation function matrix; and further comprising at least one of the following:
      modifying the elements of said non-coherent search matrix on the basis of at least one statistical property of the elements of said non-coherent search matrix,
      high-pass filtering the correlation results before forming said correlation function matrix.

2. A method for synchronizing a receiver with a transmitted code-modulated spread spectrum signal, in which method at least one reference code is used, which corresponds to a code used in the modulation, and the frequency shift of the transmitted signal and the code phase of the code used in the modulation are determined, wherein a correlation step is taken to form a correlation function matrix on the basis of the received signal and said reference code, a non-coherent search matrix is formed of said correlation function matrix, and that the method comprises at least one of the following steps:
   modifying the elements of said non-coherent search matrix on the basis of at least one statistical property of the elements of said non-coherent search matrix, performing high-pass filtering before forming said correlation function matrix, wherein the formed non-coherent search matrix is two-dimensional, wherein one dimension of the non-coherent search matrix is the frequency and the other dimension is the code phase of the reference code.

3. The method according to claim 2, wherein in the modification of the elements, a parameter describing the deviation of signals is calculated from the values of the different code phases for each frequency value in the non-coherent search matrix, and said parameter describing the deviation of signals, multiplied with a scaling factor, is subtracted from each value of the code phase of said frequency value.

4. The method according to claim 2, wherein in the modification of the elements, the average is calculated from the values of the different code phases of each frequency value in the non-coherent search matrix, and said calculated average is subtracted from each value of the code phase of said frequency value.

5. A method for synchronizing a receiver with a transmitted code-modulated spread spectrum signal, in which method at least one reference code is used, which corresponds to a code used in the modulation, and the frequency shift of the transmitted signal and the code phase of the code used in the modulation are determined, wherein a correlation step is taken to form a correlation function matrix on the basis of the received signal and said reference code, a non-coherent search matrix is formed of said correlation function matrix, and that the method comprises at least one of the following steps:
   modifying the elements of said non-coherent search matrix on the basis of at least one statistical property of the elements of said non-coherent search matrix. performing high-pass filtering before forming said correlation function matrix, comprising forming said correlation function matrix, sampling the signal after the formation of said correlation function matrix at a predetermined sampling frequency, and determining the frequency of at least one spurious signal in said signal after the sampling, to suppress the effect of the interference, which is at least one of the following:
      a spurious signal close to the frequency of the signal to be received,
      DC shift interference.

6. The method according to claim 5, wherein the received signal is subjected to frequency conversion by mixing the received signal with a local oscillator signal, and that said determination of the frequency of at least one spurious signal is made on the basis of the frequency of said local oscillator signal.

7. A system comprising:
   a receiver configured for acquiring a code-modulated spread spectrum signal, for generating at least one reference code corresponding to the code used in the modulation, for determining the frequency shift of the transmitted signal and the code phase of the code used in the modulation; wherein the system is configured for forming a correlation function matrix on the basis of the received signal and said reference code, for forming a non-coherent search matrix from said correlation function matrix, and for at least one of the following:
      for modifying the elements of said non-coherent search matrix on the basis of at least one statistical property of the elements of said non-coherent search matrix,
      for high-pass filtering correlation results before forming said correlation function matrix.

8. An electronic device comprising:
   a receiver configured for acquiring a code-modulated spread spectrum signal, for generating at least one reference code corresponding to the code used in the modulation, for determining the frequency shift of the transmitted signal and the code phase of the code used in the modulation; wherein the electronic device is configured for forming a correlation function matrix on the basis of the received signal and said reference code, for forming a non-coherent search matrix from said correlation function matrix, and is configured for at least one of the following:
      for modifying the elements of said non-coherent search matrix on the basis of at least one statistical property of the elements of said non-coherent search matrix,
      for high-pass filtering correlation results before forming said correlation function matrix.

9. An electronic device comprising a receiver with means for acquisition of configured for acquiring a code-modulated spread spectrum signal, means for generating at least one reference code corresponding to the code used in the modulation, and means for determining the frequency shift of the transmitted signal and the code phase of the code used in the modulation, wherein the electronic device also comprises correlation means is configured for forming a correlation function matrix on the basis of the received signal and said reference code, means for forming a non-coherent search matrix from said correlation function matrix, and is configured for at least one of the following means:
   means for modifying the elements of said non-coherent search matrix on the basis of at least one statistical property of the elements of said non-coherent search matrix,
   means for performing high-pass filtering before the formation of said correlation results before forming said correlation function matrix.

wherein said non-coherent search matrix is two-dimensional, wherein one dimension is the frequency and the other dimension is the code phase of the reference code.

10. The electronic device according to claim 9, wherein the means for modifying the elements in said non-coherent search matrix comprise means for computing the standard deviation from the values of the different code phases for each frequency value in the non-coherent search matrix, and means for subtracting said computed standard deviation, multiplied by a scaling factor, from each code phase value for said frequency value.

11. The electronic device according to claim 9, wherein the means for modifying the elements in said non-coherent search matrix comprise means for computing the average from the values of the different code phases for each frequency value in the non-coherent search matrix, and means for subtracting said computed average from each code phase value for said frequency value.

12. The electronic device according to claim 9, comprising means for sampling the signal after the forming of said correlation function matrix.

13. The electronic device according to claim 8, comprising means for performing functions of a mobile station.

14. The electronic device according to claim 8, wherein the receiver is a satellite positioning receiver.

15. The electronic device according to claim 8, wherein the correlation means comprise a matched filter.

16. The electronic device according to claim 8, wherein said non-coherent search matrix is two-dimensional, wherein one dimension is the frequency and the other dimension is the code phase of the reference code.

* * * * *

UNITED STATES PATENT AND TRADEMARK OFFICE
CERTIFICATE OF CORRECTION

PATENT NO.       : 7,242,731 B2
APPLICATION NO.  : 10/439591
DATED            : July 10, 2007
INVENTOR(S)      : Kontola et al.

Page 1 of 1

It is certified that error appears in the above-identified patent and that said Letters Patent is hereby corrected as shown below:

At column 13, line 65, claim 5, line 14, please remove "." and insert --,-- therefor.

At column 14, line 26, claim 7, line 11, please insert --is configured-- after the word "and".

At column 14, line 67, claim 9, line 19, please remove "." and insert --,-- therefor.

Signed and Sealed this

Twentieth Day of November, 2007

JON W. DUDAS
*Director of the United States Patent and Trademark Office*